United States Patent [19]

Mano et al.

[11] Patent Number: 5,604,566
[45] Date of Patent: Feb. 18, 1997

[54] PHOTOGRAPHIC PRINTING APPARATUS AND AN IMAGE FORMING METHOD

[75] Inventors: Shigeru Mano; Ichiroh Maeda; Toshihisa Takeyama, all of Hino, Japan

[73] Assignee: Konica Corporation, Tokyo, Japan

[21] Appl. No.: 489,930

[22] Filed: Jun. 12, 1995

[30] Foreign Application Priority Data

Jun. 15, 1994 [JP] Japan ................................ 6-132942

[51] Int. Cl.⁶ .................................................. G03B 27/54
[52] U.S. Cl. ................................................ 355/70; 355/53
[58] Field of Search ................................ 355/35, 37, 46, 355/67, 70, 53; 347/171, 174; 430/200, 204

[56] References Cited

U.S. PATENT DOCUMENTS

| | | | |
|---|---|---|---|
| 4,739,373 | 4/1988 | Nishi et al. | 355/53 |
| 4,814,891 | 3/1989 | Uchiyama et al. | 358/296 |
| 4,981,765 | 1/1991 | Mizuguchi | 430/5 |
| 5,087,938 | 2/1992 | Nagumo et al. | 355/27 |
| 5,252,989 | 10/1993 | Kawakami et al. | 346/76 |
| 5,296,890 | 3/1994 | Clapp | 27/54 |
| 5,419,989 | 5/1995 | Takimoto et al. | 430/5 |

*Primary Examiner*—Arthur T. Grimley
*Assistant Examiner*—David A. Lane
*Attorney, Agent, or Firm*—Finnegan, Henderson, Farabow, Garrett & Dunner, L.L.P.

[57] ABSTRACT

In a method of printing an original image on a photographic paper with an exposure device, the exposure device has an reference exposure light, an image corresponding to the original image is formed on a mask sheet and the photographic paper is printed by exposure lights passing through the mask sheet under the reference exposure light, wherein image signals from the original image are processed so as to satisfy the condition that the mask sheet is used under the reference exposure light.

16 Claims, 10 Drawing Sheets

PHOTOGRAPHIC PRINTING APPARATUS AND AN IMAGE FORMING METHOD

BACKGROUND OF THE INVENTION

The present invention relates to a photographic printing apparatus and an image forming method by which a desired image is printing exposed onto a silver halide color photographic photosensitive material, and specifically relates to a technology by which an exposing mask is effectively formed and a high quality image is reproduced onto a sheet of printing paper.

Conventionally, when normal photographic images (landscape, people, or the like), color illustration images (logotypes or trade marks of companies, or the like), and character images (characters on greeting cards, or the like) exist simultaneously and are printed onto silver halide color photographic photosensitive material (hereinafter, called printing paper), the following operations are carried out. An exposing mask on which color illustration images and character images simultaneously exist, is made; the exposing mask is arranged on an exposing mask holder provided on a printing section in which color illustration images and character image are printed, (hereinafter, called subsidiary exposing section) in a printer; a frame of an ordinary negative film is set on a negative film holder disposed on a photographic image printing section (hereinafter, called primary exposing section); and primary exposing and subsidiary exposing operations are carried out individually on the printing paper so that a photographic print, on which photographic images, color illustration images and character images simultaneously exist, can be obtained.

The exposing mask is made for printing a large number of original images. Generally, in production processes of exposing masks (a light transmission type negative film) for printing color illustration images, a silver halide photosensitive film, which is exposed by lighting from the rear of the exposing mask in order to expose a printing paper in the printing process, is used. In these production processes of the exposing mask, initially, an original designed image is separated into three colors by a scanner, and three sheets of monochrome masks corresponding to the respective color images are made without processing the three color data. Next, a color image is formed on the same silver halide photosensitive film by three exposures, using these monochrome masks and light sources which are separated into colors of B, G and R. The silver halide photosensitive film, which was thus exposed, is developed, and then the exposing mask, by which the color images are printed, is made.

Further, there is a method in which an image is formed by exposing a printing paper three times, that is, R, G and B exposure, using a CRT (Cathode Ray Tube). However, in this method, it takes about 10 seconds due to the limitation of the quantity of light of the CRT to print a sheet of paper. Accordingly, this method is inappropriate for printing a large number of sheets of paper. A printing method, in which the exposing mask is made for printing using a light source, is more appropriate for printing a large number of sheets of paper because it takes only about 0.2 sec. for an exposing operation.

Complicated processes are necessary for making the exposing mask, and accordingly, it is fairly difficult to make the exposing mask using a simple process.

Accordingly, the exposing mask is limited to those designs previously made by processing stations, and accordingly, customer's detailed requests can not be fully satisfied, which is a problem.

Further, when color balance on the mask is unsatisfactory, it takes a long period of time to appropriately set exposing time and filter conditions in a photographic printing apparatus, which is another problem.

SUMMARY OF THE INVENTION

The present invention is presented to counter the foregoing problems. An object of the present invention is to provide a photographic printing apparatus and an image forming method in which: exposing and printing conditions are set in a data setting process in the exposing mask production process so that an optimum photographic print is obtained; the mask can be effectively produced in a short period of time when mask producing operations are simplified; and high quality edited images can be reproduced on the printing paper.

The present invention is presented to solve the foregoing conventional problems. A photographic printing apparatus in the present invention is structured as follows: the apparatus has an image input means by which an original image is read and inputted into the apparatus for obtaining an image signal; data processing is carried out after the image signal is converted into a digital signal; printing paper is exposed and printed using an exposing mask, which is produced according to image data obtained by the data processing; and the image data is formed.

Further, the photographic printing apparatus in the present invention is structured as follows: the apparatus has an image input means by which an original image is read and inputted into the apparatus for obtaining an image signal; data processing is carried out after the image signal is converted into digital signals; when a sheet of printing paper is exposed and printed using an exposing mask which is produced according to image data obtained by the data processing, the exposing mask is set after printing processes are adjusted and controlled so that the quantity of light becomes equal to a predetermined value without using the exposing mask; the original is exposed and printed onto a sheet of printing paper; and the original image is thereby reproduced.

Further, the photographic printing apparatus in the present invention may be structured as follows: the apparatus has an image input means by which an original image is read and inputted into the apparatus for obtaining an image signal; data processing is carried out after the image signal is converted into digital signals; a test patch is produced on an exposing mask which is produced according to the image data obtained by the data processing; after a transmission light passing through the test patch is measured, and printing conditions of printing paper are adjusted, the original image is exposed and printed onto the sheet of printing paper; and, thereby, the original image is reproduced.

Here, the image input means may be structured such that a combined image is obtained from a digital signal into which an analog image recorded on a transmission type original or a reflection type original is converted, or from a digital signal inputted from an image output medium.

Alternatively, the apparatus may be structured such that the digital image data obtained by the data processing is converted into analog image data, and the exposing mask is produced according to the analog image data.

Further, the apparatus may be structured such that a silver halide photographic film, on which the photographic image is recorded, and the exposing mask are combined, and they are exposed and printed onto the same sheet of printing paper.

Still further, the apparatus may be structured such that a pigment image, corresponding to the image data, is formed on a transparent supporting body by a thermal diffusion dye, whereby the exposing mask is produced.

Further, the apparatus may be structured such that a pigment image, corresponding to the image data, is formed on a transparent supporting body by thermal development photosensitive material, whereby the exposing mask is produced.

Further, the apparatus may be structured such that a pigment image, corresponding to the image data, is formed on the transparent supporting body by jets of ink, causing the exposing mask to be produced.

Further, it may be structured such that the image formed on the exposing mask is a negative image.

Still further, it may be structured such that the thickness of the exposing mask is 51 [µm] to 200 [µm].

Further, the apparatus may be structured such that the thickness of an image receiving layer formed on the exposing mask is 0.5 [µm] to 20 [µ].

Further, in a photographic printing apparatus in which an original image is exposed on a sheet of printing paper using at least the exposing mask, the apparatus may be structured such that it has a light adjusting means for adjusting the quantity of light without using an exposing mask, and an exposure means for exposing and printing the original image onto the sheet of printing paper, and the exposing and printing operation is carried out by adjusting the quantity of light to be equal to a predetermined value also in the exposure section.

Therefore, according to the image forming method of the present invention, since data is processed after the input image signal has been converted into digital signals, data processing and correction for the digital image data can be easily carried out for producing the exposing mask.

Further, according to the preferable image forming method of the present invention, since a quantity of light is adjusted and controlled to be equal to a predetermined value in order to adjust the color balance without setting the exposing mask when the exposing mask is exposed and printed, the exposure time of the printer and filter conditions can be regulated, and operations for setting various conditions can be carried out in a short period of time.

Still further, according to an preferable image forming method of the present invention, since a test patch is also produced at the time of production of the exposing mask, and the test patch is measured for adjusting printing conditions of the sheet of printing paper, even when an aging change occurs in exposure characteristics of the printer, the exposure characteristics can always be set at the optimum exposure conditions when printing is carried out, and therefore, a stable image can be reproduced on the sheet of printing paper.

Here, in the image input means in which an analog image recorded on a transparent type original or a reflection type original is converted into a digital signal, or into which an image combined with the digital signals, which are inputted from an image output medium provided outside the apparatus, is inputted, an analog image such as a picture, or the like, or a digital image is inputted from an image output medium provided outside the apparatus, and can be edited.

Further, in the apparatus in which the digital image data obtained by the data processing is converted into an analog image data, and the exposing mask is produced, the apparatus can be applied to any input image data, regardless of the form of the input image data for the exposing mask production, whether it is digital or analog.

Further, the following method can also be accepted: the original image is exposed and printed on the printing paper through the exposing mask on which a negative image is formed; or a silver halide photographic film is combined with the exposing mask, and they are exposed and printed onto the printing paper.

Still further, the exposing mask can also be produced by methods such as sublimation type recording, thermal development recording or ink jet recording, or the like.

When the thickness of the exposing mask is 51 µm to 200 µm, the handling property for the exposing mask production can be enhanced, and when the thickness of the image receiving layer of the exposing mask is 0.5 µm to 20 µm, a desirable image can be obtained in the printing operation onto the printing paper.

Further, according to the photographic printing apparatus of the present invention, when the exposing mask is exposed and printed onto the printing paper, the quantity of light of the exposure section is adjusted and controlled to a predetermined level in order to adjust the color balance before setting the exposing mask. That is, in the exposure section is provided a light measuring sensor for measuring an exposure amount and a color phase. Before setting the exposing mask, the exposure light from the exposure section without setting the exposing mask is measured by the light measuring sensor in terms of a light amount and B.G.R color balance (color spectrum), and the light amount and the B.G.R color balance of the exposure section are adjusted to a predetermined value of the reference exposure condition. Incidentally, instead of the light measuring sensor, a photographic paper can be used as a high sensitive sensor with which a light amount and a color spectrum can be measured at a time. A concrete method of adjusting the exposure section will be explained in detail in Example 2. Accordingly, exposure time and filter conditions can be regulated in the exposure section, and thereby, setting operations for various conditions can be completed in a short period of time.

DETAILED DESCRIPTION OF THE PREFERRED EMBODIMENT

A color image forming system composed of a personal computer, a scanner, a mask output apparatus, a printer, etc., will be described below as an example of an exposing mask production apparatus.

Figure 1:
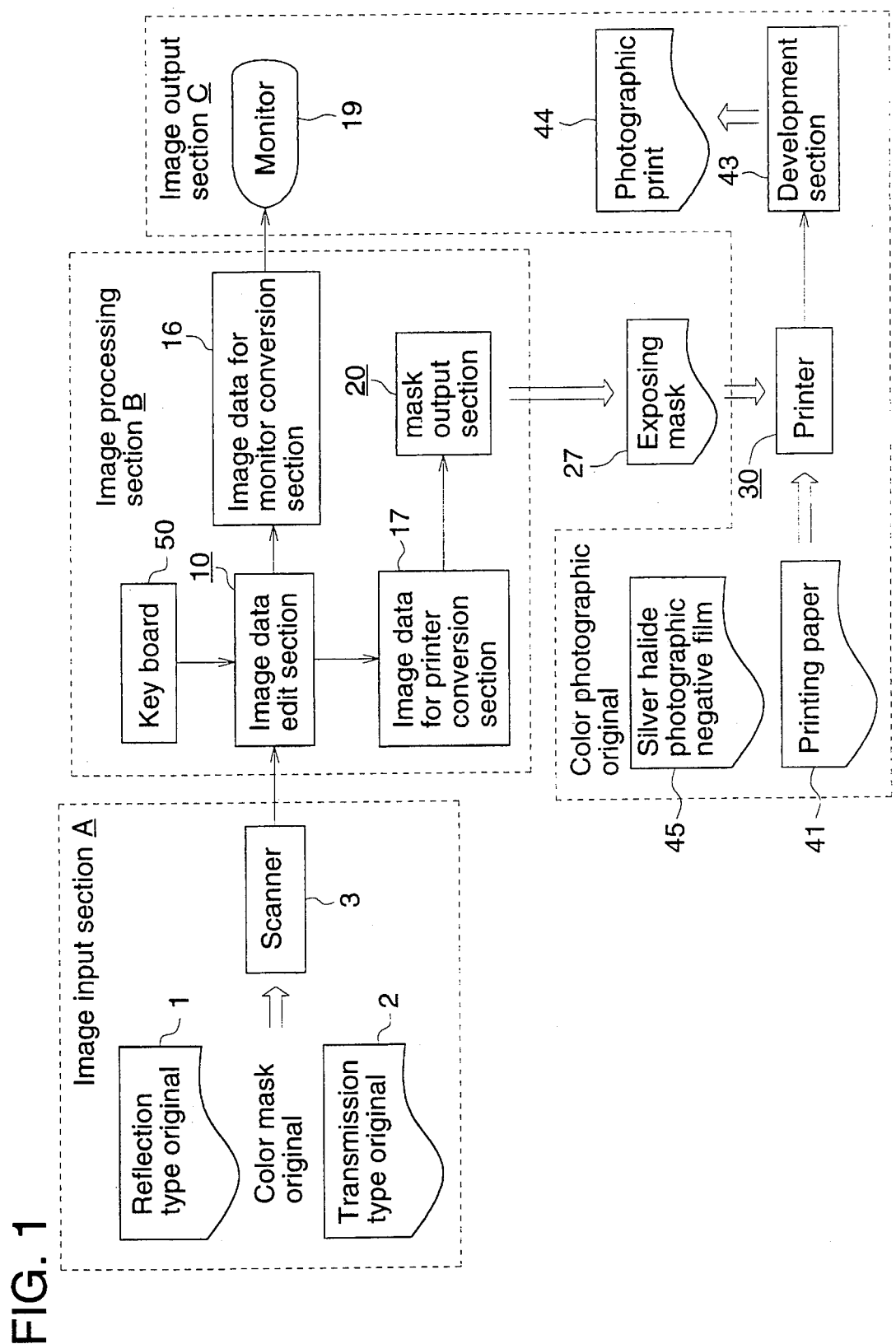
FIG. 1 is a view showing the general structure of a main portion of a color image forming system of the present invention.

FIG. 1 is a view showing the general structure of a main portion of a color image forming system using an example of the present invention. The color image forming system is composed of an image input section A, an image processing section B and an image output section C. Specifically, the image input section is composed of a scanner apparatus, the image processing section is composed of a personal computer, and the image output section C is composed of a printer and a developing apparatus.

In the image input section A, the following operations are carried out. A color mask original is read out by the image input section A, and image data is inputted into the image input section A. The image processing section B converts this image data into digital data, and carries out correction for output characteristics of the scanner, displaying on a monitor, correction processing such as color correction and gradation correction for exposure in the printer, and various image editing such as photo-retouching or the like, and thereby the exposing mask is produced. In the image output section C, image displaying on a monitor is carried out prior to photographic printing, and a photographic image is printed based on the produced exposing mask and the photographic negative film.

Details of each section will be described below.

Initially, in the image input section A, a reflection type original 1 (printed matter, silver halide photographic prints, or the like) and a transparent type original 2 (silver halide photographic film, or the like) are originals (hereinafter, called a mask original) for producing the exposing mask including a color illustration image and a character image, and each original is optically scanned by a scanner 3. In this case, a reading mode is switched depending on whether the original is a reflection type mask original or a transmission type mask original, and then the original is read out.

That is, when the original is a transparent type original 2 (the light transmission type mask original), a light source (not shown in the drawing) and a reading sensor are disposed in the scanner 3 in such a manner that they are respectively arranged on both sides of the original. The reading sensor photoelectrically converts the transmitted light into an analog signal, and outputs it as a 3-color separated analog signal. On the other hand, when the original is the reflection type original 1 (the reflection type mask original), the light source and the reading sensor is disposed in the scanner 3 in such a manner that the reading sensor can receive the reflected light from the original, and a 3-color separated analog signal is obtained. In this connection, a reflection type scanner and a transparent type scanner may be separately provided as the scanner 3.

Next, processing operations in the image processing section B will be described.

Figure 2:
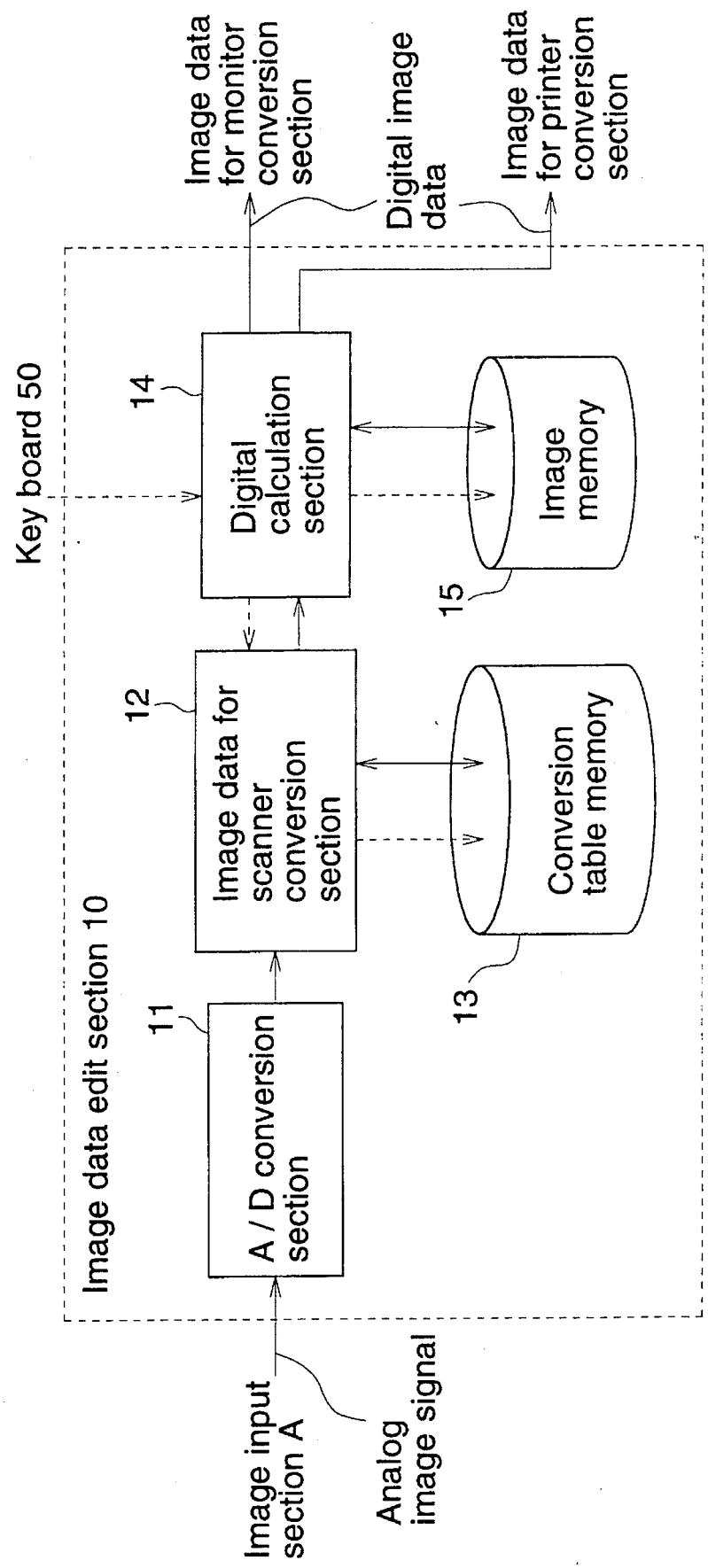
FIG. 2 is a block diagram showing the detail of an image data edit section of the present invention.

The analog image signal of the color mask original outputted from the scanner 3 is inputted into an image data edit section 10, and digital conversion and image editing such as photo-retouching are carried out. A detailed block diagram of these operations is shown in FIG. 2. In FIG. 2, an A/D conversion section 11 converts the inputted analog image signal into 8-bit digital image data, and outputs it to a scanner image data conversion section 12.

A image data for scanner conversion section 12 has a conversion table memory 13, and converts the read out image data so that the converted image data can be processed as predetermined image data, by using a data conversion table which is previously prepared for each scanner or for each color mask original.

That is, in the case where a scanner made by other manufacturers is used, even if the same color mask original is read out, its output characteristics are different, and the color density is also different depending on the surface property due to the sheet quality in either of the reflection type original or the transparent type original, or depending on the inks with which an image is formed.

Accordingly, when the density and the color phase of the inputted data are converted using the data conversion table, fluctuation factors of various image data depending on the types of scanners and originals, are corrected.

A digital operation section 14 is a central section of the image data edit section 10, and operates as follows. It controls the above-described image data for scanner conversion section 12, or carries out an input/output control of digital image data to an image data for the monitor conversion section 16 and an image data for the printer conversion section 17, which are connected to a rear portion of the image data edit section 10, according to an edit program which has been written previously in the random access memory (not shown) of a hard disk installed in the digital operation section 14. Further, this digital operation section 14 carries out the photo-retouching operation by which a plurality of types of original images are composed, the changing operation of the color phase and the density of the read-in color mask original, and edit processing such as lettering, or the like.

For example, when operators input the type of scanner and the type of original with a keyboard 50 before reading out of the color mask original by the scanner 3, information of the type is inputted into the digital operation section 14, and the digital operation section 14 controls this system such that a desired conversion table stored in the conversion table memory 13 is selected through the image data for scanner conversion section 12.

Further, when a color illustration image and a character image are respectively written on different color mask originals, these images are read out by the scanner 3 and temporarily stored in an image memory 15, and the above-described edit processing, that is, determination of the layout of each image using a mouse (not shown) which is provided in the image processing section B, and designation of the color phase and the density, is carried out.

Even when the types of originals are different from each other, or even when an analog image signal or a digital image signal is inputted from the image output apparatus provided outside the apparatus in such a manner that image signals are mixed, the analog signal is digitized and the above-described editing processing is still carried out.

In this connection, the editing program may be a program which is exclusively used for this system, or a commercial graphics software, and normally, the software of the edit program is protected so that it can not be rewritten.

The thus obtained digital image data for each color is outputted to the image data for the monitor conversion section 16 and to the image data for the printer conversion section 17.

Figure 3:
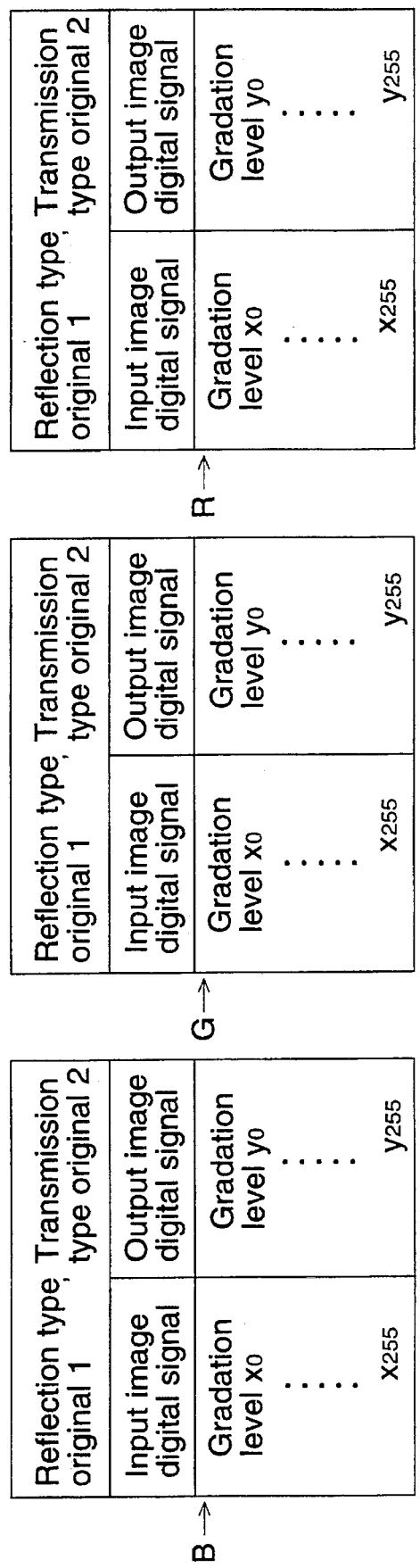
FIG. 3 is a look-up table according to a display of a monitor of the present invention.

In FIG. 3 showing the look-up table for the monitor 19, 3 look-up tables for B, G and R are previously written in a hard disk or a readable and writable memory (not shown) such as RAM, or the like, which is provided in the image data for the monitor conversion section 16.

Incidentally, a color CRT is used for the monitor because of its desirable color expressing region and a reasonable cost. R, G and R image data are displayed on the monitor, and there is no adverse influence among the primary colors because colors are reproduced by additive color mixture. Accordingly, the B, G and R look-up tables are respectively produced independently. The operation formula can be used for this purpose, too.

For the processing in the image data for the monitor conversion section 16, the input output of digital image data from the memory may be controlled by independently providing a control section, or the digital operation section 14 may also carry out the same control by providing only a memory in the image edit section 10.

In the image data for the printer conversion section 17, data conversion is carried out in the following sequence.

1. B, G and R image digital data expressing the gradation level, which is outputted from the image data edit section 10, are converted into the Y.M.C density value.

2. The undesirable absorption, which is generated by color mixture of Y, M and C, is corrected and converted.

3. The reversed transfer amount, at the time when a sublimation type thermal transfer printer is used to produce an exposing mask, is corrected and converted.

4. The Y.M.C density value is converted into Y, M and C image digital data, expressing the gradation level.

Figure 4:
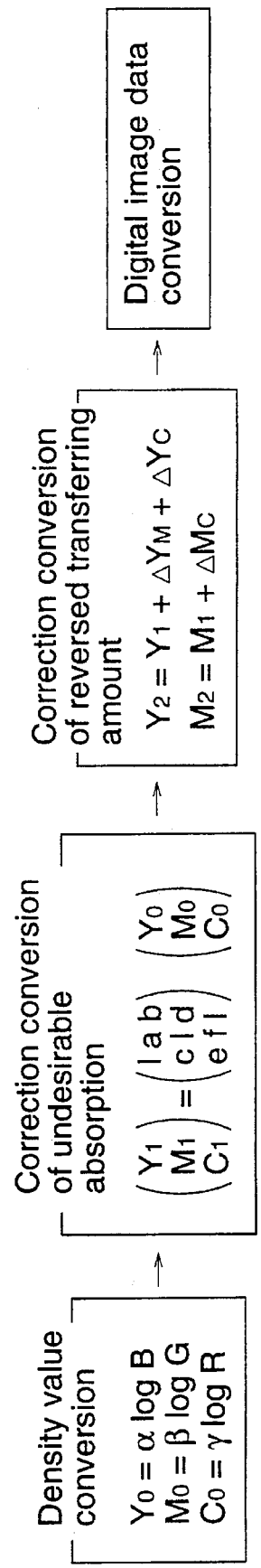
FIG. 4 is a view showing a correction conversion function of a reversed transferring amount in the present invention.

As described before, there are many types of correction in the image data for the printer conversion section 17, and further, it is necessary to carry out corrections for 256 steps for the 3 colors. Accordingly, as shown in FIG. 4, the image data conversion is carried out using the operation formula relating to the recording characteristics of the printer 30. Specifically, in the correction of the undesirable absorption, it is difficult to independently convert Y, M and C digital image data, and when the image data is converted in the form of the look-up tables, large amounts of table data are necessary. Accordingly, it is desirable to use the operation formulas or the look-up table together with interpolation calculations.

In FIG. 4, initially, a density value conversion formula is used, and B, G and R image digital data expressing the gradation level, which is outputted from the image data edit section 10, are converted into density values of $Y_0$, $M_0$ and $C_0$. When the image data is converted into density value, subsequent correction operations can be processed by addition, multiplication and division without using exponential functions, resulting in higher operational speed. In this connection, B, G and R are image digital data expressing the gradation level, and $\alpha$, $\beta$, $\gamma$ are operation coefficients.

Next, correction conversion of the undesirable absorption is carried out. Here, referring to FIG. 5, the undesirable absorption will be explained as well as the exposing mask 27.

Figure 5:
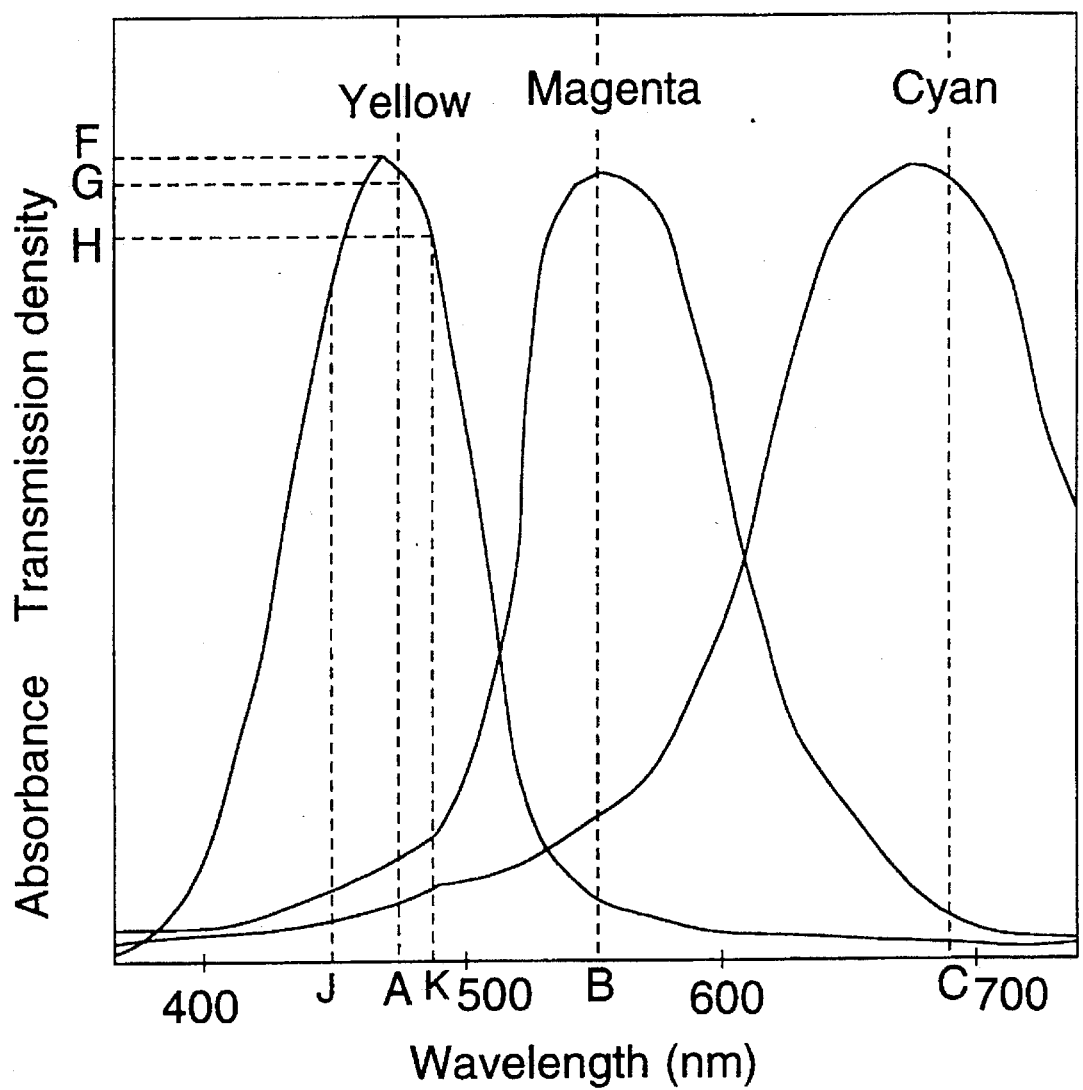
FIG. 5 is a view showing a light transmission spectrum of a exposing mask in the present invention.

FIG. 5 shows the light transmission spectrum of the exposing mask 27. In FIG. 5, the vertical axis expresses the absorbance (transmission density), and the horizontal axis expresses the wave length of light. The wave length, corresponding to the maximum value of each spectral sensitivity of each of the regular, orthodox and panchromatic layers of the printing paper 41, is respectively expressed by A [nm], B [nm] and C [nm], and each layer has a coloring component which respectively changes color to blue (B), green (G), and red (R). That is, the image is exposed onto the printing paper 41 with a white light source when the exposing mask 27 is used as a transmission filter. When the Y exposing mask is used, M and C coloring components are subjected to the subtractive color mixture by G and R light which has been transmitted through the exposing mask, and the coloring components are caused to change color to B. When the M exposing mask is used, Y and C coloring components are subjected to the subtractive color mixture by B and R light which has been transmitted through the exposing mask, and the coloring components are caused to change color to G. When the C exposing mask is used, Y and C coloring components are subjected to the subtractive color mixture by B and G light which has been transmitted through the exposing mask, and these coloring components are caused to change color to R.

Accordingly, when coloring characteristics of the printing paper 41 are adjusted with respect to the quantity of light (i.e. transmission density) which has been transmitted through the exposing mask 27 for each color, the reproducibility of the image on the printing paper can be enhanced. The following was experimentally confirmed. When the transmission density of colors Y, M and C of the exposing mask 27, which is used in this example, is more than 1.5 (which was measured by a densitometer X-Light, made by X-Light Co., in the status M mode), and preferably more than 1.7 in the maximum sensitivity wavelength of 470 (A) [nm], 550 (B) [nm], 690 (C) [nm] of the printing paper 41 to be used (Konica QA paper by Konica Co.), the optimum gradation expression ability of the printing paper 41 is brought out.

Further, the following was clarified experimentally. When the coloring components of the exposing mask 27 are selected so that the maximum sensitivity wavelength A [nm], B [nm] and C [nm] of each spectrum sensitivity of each of the regular type, orthodox type, and panchromatic type of the printing paper 41, to be used for printing, exist in the wavelength region corresponding to more than 80% of the maximum transmission density of each of Y, M and C of the exposing mask 27, and preferably more than 90% of that, the chroma of the photographic print is enhanced.

In FIG. 5, the wavelength A [nm] of the maximum value of the spectrum sensitivity of regular type of the printing paper 41 to be used for printing, exists in the wavelength range J [nm] to K [nm] showing transmission density H which is more than 80% of the maximum transmission density F of Y of the exposing mask 27. In the same way as described above, wavelengths B [nm] and C [nm] of the maximum value of the spectrum sensitivity of the orthodox type and panchromatic type of printing paper 41, also exist in the wavelength range showing the transmission density which is more than 80% of the maximum transmission density, which is also true for M and C of the exposing mask 27.

Accordingly, when the matrix type correction conversion formula of the undesirable absorption which was set by referring to the characteristics which became clear from the result of the above-described experiments in FIG. 4 is used, then, $Y_0$, $M_0$ and $C_0$, which were converted into density values, are converted into correction values $Y_1$, $M_1$ and $C_1$ of the undesirable absorption. Incidentally, characters a, b, c, d, e, f are operation coefficients.

As described above, conventionally, the undesirable absorption was corrected by a feeling at the time of printing, however, when the mathematical operation is carried out using a preset formula, the correction can be simply and efficiently carried out before the mask production or photographic printing.

Next, the correction conversion of a reversed transferring amount is carried out. The reversed transferring amount will be described below.

In this example, a sublimation type thermal transfer printer, which will be described later, (hereinafter, called the sublimation printer), is used in a mask production section 20 due to its compact size, low cost and better image quality, and also due to the fact that it can be directly connected to a personal computer. Although the sublimation printer has the above advantages, it also has disadvantages specific to its image formation method, described as follows.

A part of dye Y, which was transferred onto the image receiving layer, is removed from the image receiving layer when heat is applied and when another dye M is subsequently transferred onto the image receiving layer located in the same position as dye Y. Sometimes, accordingly, the phenomena of a lowered density occurs.

There is indication that the amount of this reversed transfer is increased almost proportionally to the amount of the dye which was transferred onto the image receiving layer. In the case where a positive image is directly outputted using the sublimation thermal transferring method, even when large density fluctuations occur in the higher density region, compared with the case in the low or middle density region, a major problem occasionally occurs because, naturally, human visibility characteristics are lower in the higher density region. However, in the case where a negative image is outputted as in this example, when the density in the higher density region is lowered, the density fluctuations in the lower and middle density regions are the same as in the higher density region, and it is quite conspicuous.

Accordingly, in the case where the negative image is produced by the sublimation printer, when the lowered density of the coloring components is not corrected, the image quality is severely lowered. Therefore, when the correction operation is carried out using correction conversion functions of the reversed transferring amount shown in FIG. 4, the correction values $Y_2$ and $M_2$ of the reversed transferring amount can be found from the correction converted values $Y_1$, $M_1$ and $C_1$ of the undesirable absorption. Here, C is not corrected due to the fact that the reversed transfer does not occur because the dye C is the last to be transferred in the sublimation printer.

In this example, the following approximation of secondary function is used for correction conversion functions in the drawing.

In the case where printing is conducted in the sequence of Y, M and C, when a change in density, in which the density of Y is lowered due to the printing of M, is defined as $\Delta Y_M$, and when a change in density, in which the density of Y is lowered due to the printing of C, is defined as $\Delta Y_C$, and when a change in density, in which the density of M is lowered due to the printing of C, is defined as $\Delta M_C$, then, $$\Delta Y_M = A_1 M_1^2 + B_1 M_1 + D_1$$

$$A_1 = a_1 Y_1^2 + a_2 Y_1 + a_3$$
$$B_1 = b_1 Y_1^2 + b_2 Y_1 + b_3$$
$$D_1 = d_1 Y_1^2 + d_2 Y_1 + d_3$$

$$\Delta Y_C = A_2 C_1^2 + B_2 C_1 + D_2$$

$$A_2 = a_4 Y_1^2 + a_5 Y_1 + a_6$$
$$B_2 = b_4 Y_1^2 + b_5 Y_1 + b_6$$
$$D_2 = d_4 Y_1^2 + d_5 Y_1 + d_6$$

$$\Delta M_C = A_3 C_1^2 + B_3 C_1 + D_3$$

$$A_3 = a_7 M_1^2 + a_8 M_1 + a_9$$
$$B_3 = b_7 M_1^2 + b_8 M_1 + b_9$$
$$D_3 = d_7 M_1^2 + d_8 M_1 + d_9$$

The density to be found, in which the change in density is corrected, is expressed by the following equations:

$$Y_2 = Y_1 + \Delta Y_M + \Delta Y_C$$

$$M_2 = M_1 + \Delta M_C$$

Here, the following are calculation coefficients:

$a_{1,2,3,4,5,6,7,8,9}$, $b_{1,2,3,4,5,6,7,8,9}$, $d_{1,2,3,4,5,6,7,8,9}$.

As described above, when the decrease of density is corrected by the preset equations, the sublimation printer can be used as an exposing mask output printer of the exposing mask producing apparatus due to the above-described advantages.

Finally, the density values $Y_2$, $M_2$, in which the reversed transferring amount is correction converted, and the density value $C_1$, in which the undesirable absorption is correction converted, are converted into Y, M, C digital image data expressing the gradation level using the digital image data value conversion formulas, and these are outputted to the mask production section 20. As also described above, in the correction in the image data for the printer conversion section 17, when the correction of the reversed transferring amount is carried out after the correction conversion of the undesirable absorption, the correction of the reversed transferring amount is more appropriate. Accordingly, the image quality can be enhanced more.

Further, in the correction of the undesirable absorption and the reversed transferring amount, not only the correction in the mask production section 20 is carried out, but correction is also carried out so that, finally, there is no influence from the undesirable absorption and the reversed transfer on the photographic print. The calculation coefficients for carrying out a series of the data conversion are set considering characteristics concerning development section 43, printer 30, and the color characteristics and density characteristics of the printing paper 41, and when these calculation coefficients are set in the image processing section B, the adjustment of the whole system can be carried out simply and in a relatively short time.

Each of Y, M and C digital image data, which are outputted from the image data for the printer conversion section 17, is inputted into the mask production section 20, and the exposing mask 27 for the negative image is produced by the sublimation type thermal transfer system in the mask production section 20.

Figure 6:
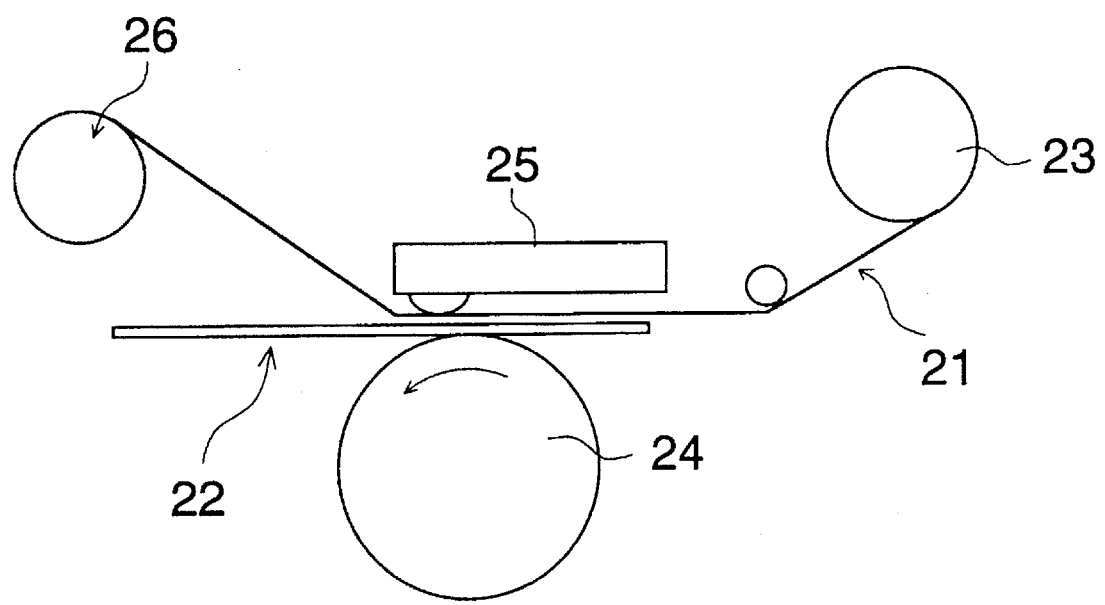
FIG. 6 is a view showing the general structure of a sublimation printer in the present invention.

FIG. 6 is a view showing the general structure of the mask production section 20, that is, the sublimation printer. The sublimation printer will be described referring to FIG. 6 below.

An ink sheet 21 is formed as follows. Each of Y, M and C thermal diffusive dyes is sequentially coated repeatedly on the transfer surface having the same dimensions as the transparent image receiving sheet 22, and each dye is sequentially transferred and recorded onto the transparent image receiving sheet 22 corresponding to digital image data expressing the gradation level.

As a specific example of a sublimation printer, the sublimation printer in which a thermal head is composed of a heat element having a recording density of 300 DPI, is used. In this sublimation type thermal transfer printer, when energy applied to the thermal head is changed, each color of Y, M and C can be expressed in a density of 256 gradations per dot. The relative travelling distance per single operation in the subsidiary scanning direction of the sublimation type printer is 85 [μm].

The ink sheet 21 is formed when each of Y, M and C layers is provided on a polyethylene telephthalate supporting body, which has a fusion adherence prevention layer on its rear surface, and a thickness of 6 [μm]. The transparent image receiving sheet 22 is formed when a solution, in which 1 part of silicone oil and 60 parts of vinyl chloride are dissolved in 300 parts of methyl ethyl ketone, is coated on the transparent polyethylene telephthalate supporting body, the thickness of which is 100 [μm], such that the dry weight is 15 g/m$^2$, and in this manner, the image receiving layer is formed.

As recording characteristics, there are cases in which the output density has an approximately proportional relationship with respect to the input gradation level of 256 steps, and in which it has approximately a relationship of a curve of the secondary order. In either case, when calculation coefficients are set, these coefficients can be applied to the recording characteristics of the sublimation printer.

At the time of transfer recording, for example, when the transparent image receiving sheet 22 is A4 size, each surface of Y, M and C of the ink sheet 21 is also the A4 size. When the ink sheet 21 is delivered from an ink sheet supply roller 23, it sequentially moves under the thermal head 25 such that initially the surface Y and the transparent image receiving sheet 22 are superimposed on each other when a platen roller 24 is rotated in the direction of an arrow in FIG. 6.

During the above operations, the digital image data, expressing gradation level Y, is inputted into the thermal head 25. Accordingly, thermally diffusive dye Y, in the ink in the ink sheet, forms an image of coloring component, having the gradation in the image receiving layer, due to a coloring component moving amount, corresponding to an amount of thermal pulses applied onto the transparent image receiving sheet 22 when the the heat is applied.

When the recording transfer of Y is completed, the ink sheet 21 is wound to the leading edge of the surface M by the winding roller 26. Simultaneously, the transparent image receiving sheet 22 is returned again so that the leading edge of the sheet is located at the thermal head 25 recording position. Then, the ink sheet 21 is ready for the transfer recording of M in such a manner that surface M of the ink sheet 21 is almost superimposed on the transparent image receiving sheet 22. In this way, recording processing of M and C is repeated. When these recording processing are repeated a total of three times in the same manner, the color image is recorded on the image receiving layer of the transparent image receiving sheet 22, and the exposing mask 27 is formed.

In this connection, although the 3 types of thermally diffusive dyes Y, M and C are coated on the ink sheet 21, a black dye (BK) may also be applied to these dyes. Further, in the exposing mask 27, the transparent supporting body for supporting the image receiving layer is provided, and its thickness is in the range of 50 μm to 200 μm for the sake of the operability, and specifically, it is preferably in the range of 75 μm to 150 μm. That is, when the thickness is too large, it is difficult to cut it into a predetermined dimension, and further, the cost is increased. On the other hand, when the thickness is too small, it is difficult to insert the mask into the printer 30, and further, there is a possibility that jamming will occur. Accordingly, the above described range is set due to these reasons. When the exposing mask 27 is produced, a test patch may be formed in a non-image area in order to adjust the color balance.

A transparent supporting body, in which resin is stretched into a film or sheet, and is heat-set processed in view of the dimensional stability, is used in this example. As resin, the following resins can be used: acrylic resin such as acrylic acid ester, or methacrylic acid ester; polyester resin such as polyethylene telephthalate (PET), polybutylene telephthalate, polyethylene naphthalate, polycarbonate, polyallylate, etc.; polyolefine resin such as polyvinyl chloride, polyvinylidene chloride, polyvinylidene fluoride, polyethylene, polypropylene, polystyrene, etc.; polyamide resin such as nylon, aromatic poliamide, or the like; polyether ether ketone; polysulfone; polyether sulfone; polyimide; polyether imide; polyparabanic acid; fluoric resin; silicone resin; or the like. Specifically, in view of the handling property, polyester resin such as PET, polybutylene telephthalate, polyethylene naphthalate, polycarbonate, polyallylate, etc., is preferable.

Figure 7:
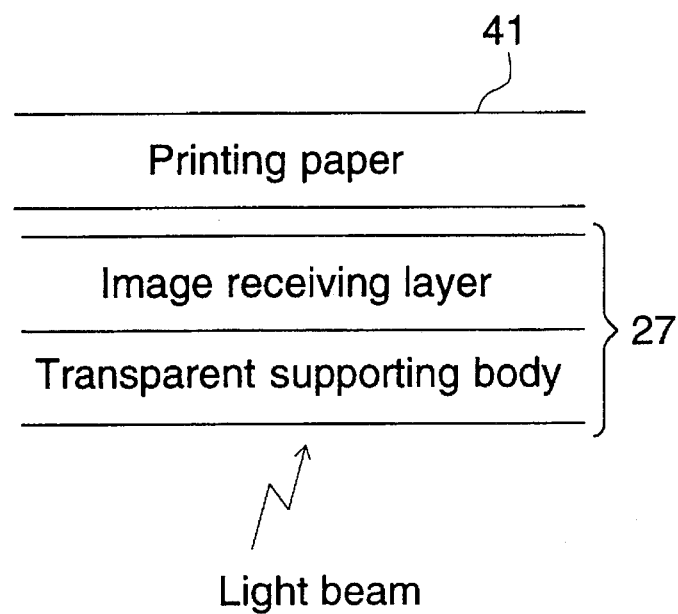
FIG. 7 is a sectional view of the exposing mask in the present invention.

In FIG. 7 showing a section of the exposing mask 27, the thickness of the image receiving layer is set in the range of 0.5 μm to 20 μm which provides higher image quality. That is, the following was clarified in the experiments. In the case where the exposing mask is used in a close contact exposing type printer, when the thickness is too large (specifically more than 25 μm), the image is greatly blurred as compared with the image receiving layer having the thickness of less than 20 μm. Conversely, when the thickness of the image receiving layer is too small (specifically less than 0.4 μm), the desired transmission density of 1.5 can not be obtained. Accordingly, the above range is preferable for the characteristics of the image receiving layer since it achieves both effects.

Figure 8:
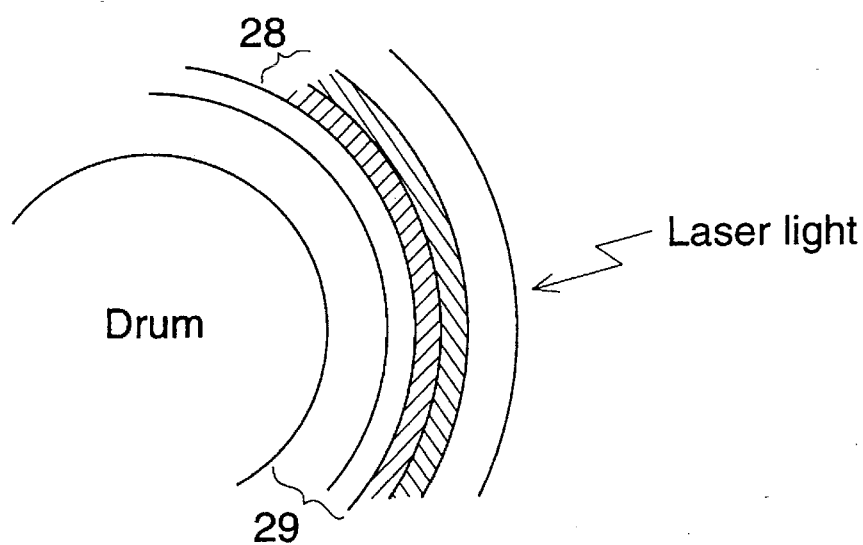
FIG. 8 is a view showing the general structure of a laser recording apparatus in the present invention.

As another example of the sublimation printer, there is a method in which a laser beam is used instead of the thermal head. In FIG. 8, the general structure of this recording apparatus is shown.

In this case, an image receiving sheet 29 and a sheet-shaped dye providing element 28, by which the exposing mask 27 is produced, are wound around a drum, and a laser beam is projected onto them to achieve transfer recording.

Initially, a material having strong absorption property in the wavelength region of the laser beam, is included in the dye providing element 28. When the dye providing element 28 is irradiated by the laser beam, this absorption material converts the optical energy into thermal energy. Then, the Y, M and C dyes located directly below the absorption material is heated to its evaporation temperature, and is transferred onto a dye image receiving element of the image receiving sheet 29. This absorption material, which includes carbon, is a light/heat conversion layer having a thickness of about 1 [μm] and may be positioned on the layer located directly below the dye, or may be mixed directly with the dye.

The laser light is adjusted by electric signals corresponding to the shape and color of the image. When this adjustment is carried out, the image is reproduced onto the image receiving sheet 29, and the exposing mask 27 is obtained. Conditions of the laser light to be used are as follows: the spot diameter is 30 [μm], the exposure time is 5 [msec], the wavelength is 830 [nm], and the laser light scans the drum 19 with the impression energy of 0 to 44 [μw/μm$^2$] while the drum 29 is being rotated at 180 [rpm].

In the mask production section 20, the following type recording technology may be adopted instead of the above-described heat sublimation recording type technology. In the case where the exposing mask is used in the same way as above in the close contact exposure type printer, a dye, which is converted by light/heat conversion and generates color, is coated on the transparent supporting body, and is irradiated by a light beam corresponding to the image data. Thereby, the exposing mask is obtained in the thermal development recording type technology, (which is disclosed in Japanese Patent Publication Open to Public Inspection Nos. 316040/1992, and 43618/1994). So-called ink jet recording type technology in which drops of an ink corresponding to the image data are jetted onto the transparent supporting body in order to obtain the image, may also be adopted. These recording technologies were previously obvious to persons skilled in the art.

When the thickness of the image receiving layer in the thermal development recording, and the thickness of the layer to be formed by the jetted ink in the ink jet recording are respectively in the range of 0.5 μm to 20 μm, a superior image quality is obtained at the time of printing exposure.

Further, when the system is structured such that: a transparent densitometer is provided in the mask production section 27 and the transmission density of the exposing mask 27 outputted from the densitometer is periodically measured; the measured density is fed back to the image data for the printer conversion section 17; the deviation between the density data and the designed value is detected; and the calculation coefficients are rewritten so that the deviation can be corrected, even if an aging change occurs in the mask production section 27, it can be positively corrected, and stable images can be reproduced on the printing paper.

Next, referring to FIG. 1, the image output section C will be described.

The digital image data, which is converted in the image data for the monitor conversion section 16, is inputted into the monitor 19 for display.

On the other hand, the mask 27 outputted from the mask production section 20, and the silver halide photographic negative film 45 for the photographic image are respectively arranged at a predetermined position, and printing exposed onto the printing paper 41.

Figure 9:
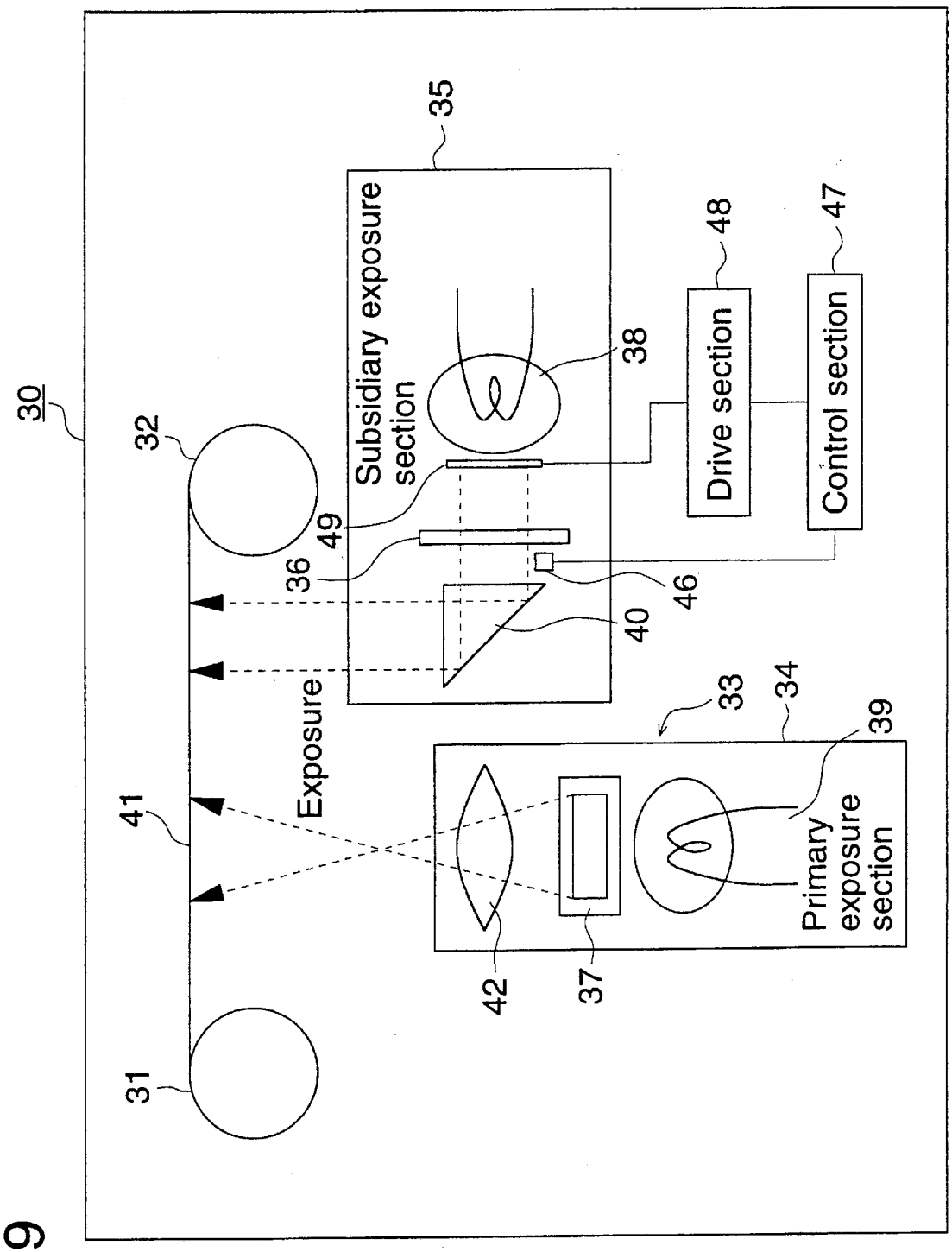
FIG. 9 is a view showing the general structure of a printer in the present invention.

In FIG. 9 showing the general structure of the printer 30, the roll-shaped printing paper 41 is previously set around the printing paper supply roller 31, moves for each printing exposure, and is wound around the printing paper winding roller 32. The exposure section 33 is separated into a primary exposure section 34 and a subsidiary exposure portion 35. The exposing mask 27 is disposed on an exposing mask holder 36 in the subsidiary exposure portion. The silver halide photographic negative film 45 for the photographic image is disposed on a negative film holder 37 in the primary exposure section. The printing exposure is carried out as follows. The light beams emitted from the light sources 38 and 39, which are separately provided, transmit through the exposing mask 27 and the silver halide photographic negative film 45; and the light beams irradiate the printing paper 41 for a predetermined period of time through a prism 40 or a lens 42.

A light measuring sensor 46 for measuring the exposure amount and a color phase is provided between the exposing mask holder 36 and the prism 40. Data of the exposure amount and the color phase, measured without setting the exposing mask 27, is outputted to the control section 47. On the other hand, the control section 47 has the reference data for adjusting the printing exposure in its internal memory, not shown in the drawing. When the control section 47 controls the drive section 48 according to the deviated amount between the reference data and the output data from the light measuring sensor 46, a light adjusting filter 49 provided near the light source 38 is adjusted, and a quantity of light from the light source 38, the color balance, and the like, are finely adjusted.

In this connection, although the exposure section 33 comprises the primary exposure section 34 and the subsidiary exposure section 35, the following structure may be adopted. This system may be composed of either of the above two exposure sections, and the quantity of light is adjusted without the exposing mask 27 in the same way as the above-described, and printing is carried out onto the printing paper 41.

Figure 10:
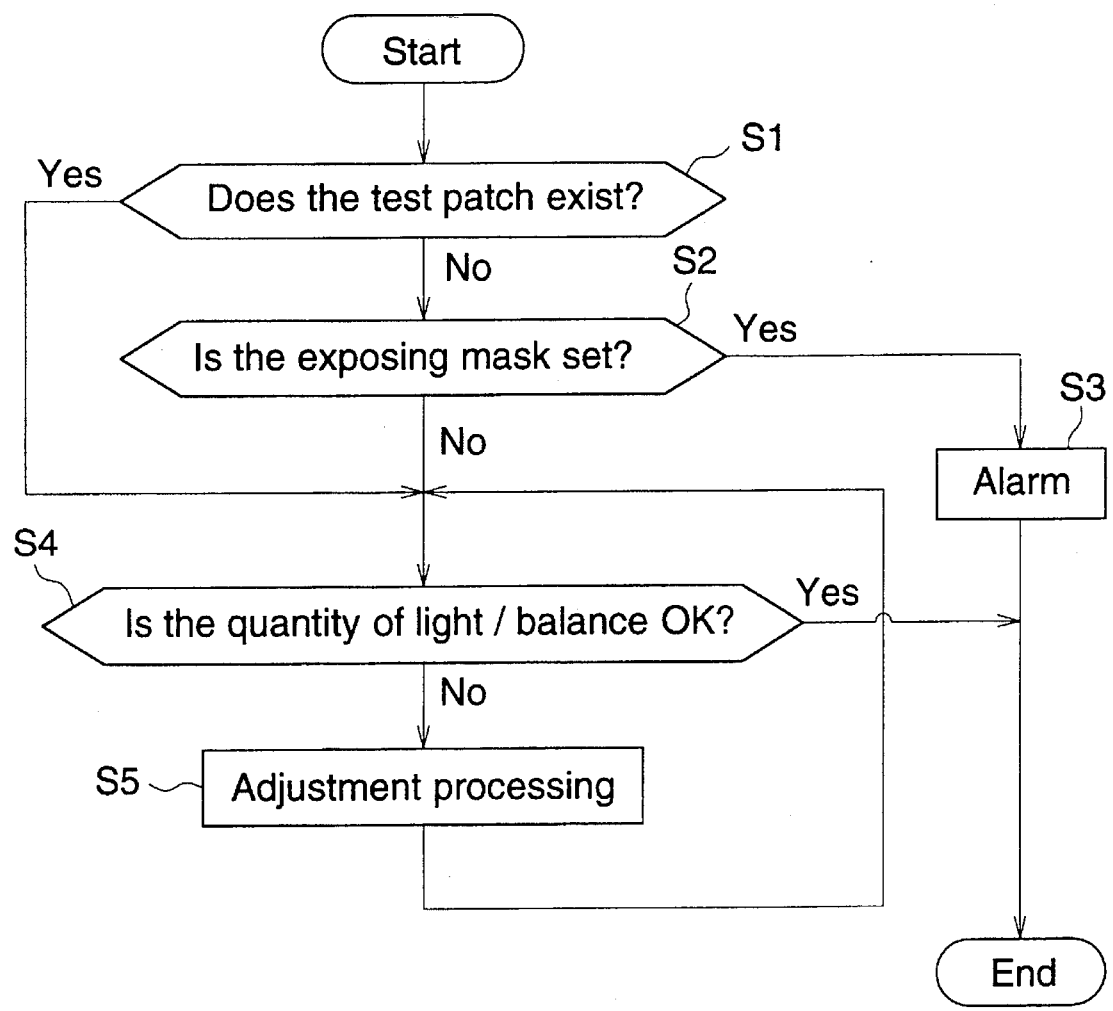
FIG. 10 is a flow chart for adjustment printer processing in the present invention.

Referring to the flow chart shown in FIG. 10, adjustment processing of the printer 30 will be explained below.

Initially, because there are two cases, one in which the exposing mask 27 has a test patch, and one in which it has no test patch, the existence or non-existence of the test patch is detected by the light measuring sensor 46. In the case of non-existence, the exposing mask is judged to be an ordinary mask, and it is judged whether or not the mask 27 is set on the exposing mask holder 36 (S1, S2). When the mask 27 is set on the holder, an exposure amount of the light source 38 can not be measured. Accordingly, an alarm is generated and the sequence comes to an end without conducting the adjustment processing (S3).

In cases where the exposing mask has the test patch, a quantity of light and color balance are measured (S4), and when adjustment of the quantity of light and the color balance has been completed, the sequence comes to an end without conducting any additional operation. When the measured values are deviated from the reference values, the control section 47 controls the drive section 48, and the light adjusting filter 48 is adjusted so that the quantity of light of the light source 38 and the color balance are adjusted (S5). Then, the quantity of light and color balance are fed back to a light measuring operation, and adjustment processing and light measuring processing are repeated several times. When the adjustment of the quantity of light and the color balance has been completed, the sequence comes to an end.

As described above, the printer 30 in this example can function to independently adjust the quantity of light and color balance. Accordingly, even when the aging change occurs in exposure characteristics of the printer 30, the optimum exposure conditions can be set and always maintained at the time of printing, by the fine adjustment.

In this connection, in the printing exposure processing, a compound image may be printed onto the printing paper 41 using both the primary exposure and the subsidiary exposure, or the image may be printed onto the printing paper 41 using only the subsidiary exposure. The printing paper 41, onto which the image has been printed, is subject to the subtractive color mixture so that the paper has complementary colors B, G and R of Y, M and C, and thereby the paper generates colors. Then, the paper is development processed in the development section 43, and a photographic print 44 is obtained.

As described above, in the image processing section B, calculation coefficients for converting a series of data are set, considering the development section 43, the printer 30, various characteristics relating to the reproducibility such as color characteristics, and density characteristics of the printing paper 41. Accordingly, in an image such as a color illustration image, or character image, corresponding to the exposing mask 27 of the photographic print 44, the density and the color phase of the color mask original are accurately reproduced. Color matching in each processing section, located in the range from the data reading section to the printing section, in the case where the transmission type original or the reflection type original is used, can be simply and rapidly realized.

Next, the adjustment for setting the correction values and calculation coefficients in the image processing section B will be explained.

(EXAMPLE 1)

The adjustment in the production stage of the present invention is carried out as follows. Generally, with a color test chart which is used instead of the color mask original, the adjustment is carried out in such a manner that the display output of the monitor 19 and the photographic print 44 respectively have the same reproducibility.

Initially, in the case where the color test chart is the transmission type (negative), it is printed onto a reference printing paper (QA paper TYPE: A6 by Konica Co.) by the printer 30 under reference exposure conditions mentioned later in Example 2, developed in the development section 43, and a positive image is obtained. A 12-step reflection density $A_{nega}$ (maximum density of 1.8, minimum density of 0) is measured by a reference densitometer (X-Light Densitometer by X-Light Co.) for each color on the color test chart. In the case where the color test chart is a reflection type (positive), the 12-step reflection density $A_{posi}$ is measured directly by the reference densitometer for each color on the color test chart.

Next, the color test chart is read out by a scanner 3, and the image is displayed on the monitor 19. A 12-step density B is measured by the reference densitometer, and the exposing mask 27 is produced. The image is printed onto the reference printing paper by the printer 30 under the above reference exposure conditions. The 12-step reflection density C of the positive image, which is obtained by the development in the development section 43, is measured by the reference densitometer.

Then, the data conversion table value in the image data for the scanner conversion section 12 is set so that $A_{nega}$ and $A_{posi}$ have the same scanner output value even when the types of the scanners and the originals are different from each other. Fluctuations due to the difference of types of the scanners and the originals are eliminated by the above setting.

Further, when the look-up table of the image data for the monitor conversion section 16 is set so that $A_{nega}$ and $A_{posi}$ are equal to B, the image of the color chart is equal to that on the monitor 19. Further, when calculation coefficients in the image data for the printer conversion section 17 are set so that $A_{nega}$ and $A_{posi}$=C, and B=C, then, the color test chart is equal to the image corresponding to the mask 27 of the photographic print 44 and also equal to the image displayed on the monitor 19.

Although, normally, the color types of the color test chart are Y, M, C and Bk, colors MY, MC and CY may be added to these colors, or the color type of the color test chart may be only Bk.

(EXAMPLE 2)

The adjustment in Example 2 is carried out in the same way as in Example 1, as a basic adjustment on the production stage of this system.

a. Setting of exposure conditions in the printer

The printer 5N3 (made by Konica Co.) was used as the printer 30 shown in FIG. 9, and exposure conditions in the subsidiary exposure section are set as follows. A gray exposing mask, in which transmission density, measured by the densitometer (made by X-Light Co., X-Light 310, status M), is set so that B, G, R=1.0, was prepared, and set in the subsidiary exposure section. Then, the reference printing paper (Konica QA paper TYPE: 6) was printed through the mask. The printed reference printing paper, was developed under the reference development conditions, and the reflection density of the printed reference printing paper was measured by the densitometer (made by X-Light Co., X-Light 310, status A). The exposure conditions in the subsidiary exposure section were set so that the reflection density of the printed reference printing paper was B.G.R= 0.8 in gray, and the exposure conditions were defined as the reference exposure conditions.

b. Verification of the conversion specification of the output section

A personal computer was used as the image data edit section shown in FIG. 1, and 125 (5×5×5) reference image signals were made by combination of the following data.

B=0, 64, 128, 192, 255

G=0, 64, 128, 192, 255

R=0, 64, 128, 192, 255

Figure 11:
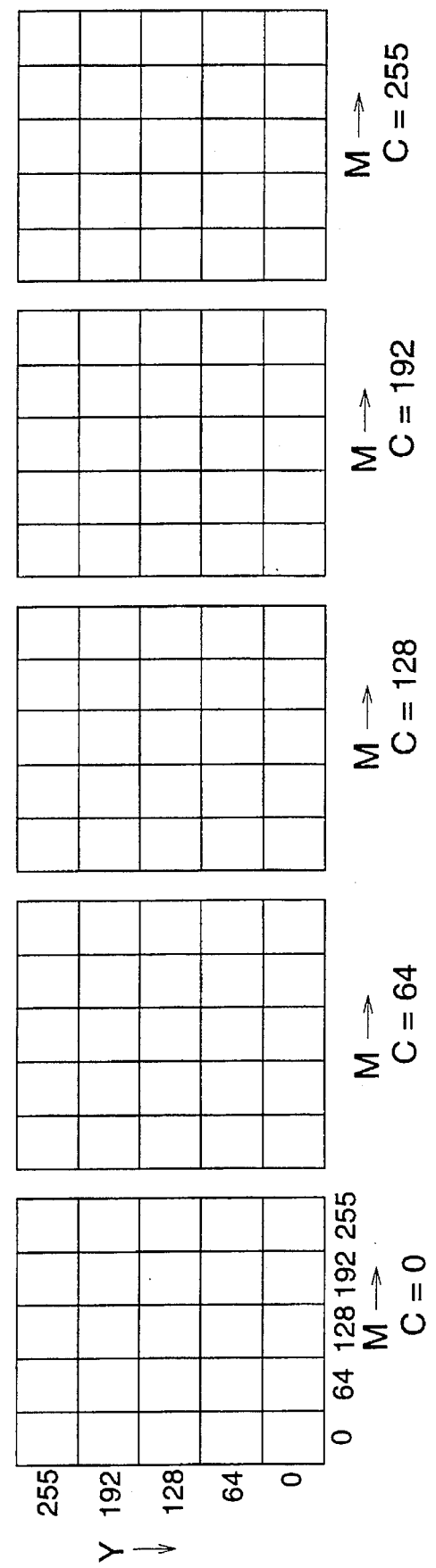
FIG. 11 is an illustration of color samples.

An exposing mask for a color patch as shown in FIG. 11 corresponding to the 125 reference image signals, was produced by the sublimation type thermal transfer printer in which each of Y, M and C can be expressed by 256 gradations with 300 DPI. This exposing mask was set in the subsidiary exposure section of the printer 5N3, and the color patch was printed onto the reference printing paper (Konica QA paper TYPE: A6) under the above reference exposure conditions. This printing paper was developed under the reference development conditions, and the color patch corresponding to the above data was produced onto the reference printing paper. Color values (tristimulus values) of the color patch were measured by a colorimeter (made by Murakami Color Engineering Laboratory, CMS-500 Spectral reflection meter). The relationships between the reference image signal in the image output section and tristimulus values were thereby obtained.

c. Verification of the conversion specification of the input section

The color patch as shown in FIG. 11 was produced on the reference printing paper (Konica QA paper TYPE: A6) by a laser printer, and color values (tristimulus values) of each patch were measured by the colorimeter. Further, colors of each patch were read out by a scanner. Due to this, the relationships between tristimulus values and the data read out by the scanner, which is the image input section, were obtained.

e. Verification of the CRT

The chromaticity of B, G and R fluorescent substances of the CRT and that of white were measured by a spectral emissivity meter (Topcon SRI). The relationships (γ-curve) between the input signal (digital value) of B, G, R and the luminescent intensity at that time were obtained. The relationships between the input signal (digital value) and colors (tristimulus values) were obtained by the matrix operation.

d. Production of the conversion table from the input section to the output section The $33^3$ LUTs (look-up tables), having the relationships by which colors (tristimulus values) of the input section and the output section can be reproduced, were produced based on the results of the verifications of the conversion specifications of the output section and those of the input section. That is, the conversion tables, expressing the relationships between the reference image signals of the image output section and the data read out by the scanner, were produced so that the signals and the data can have the same tristimulus values, using the tristimulus values as the reference. Due to these tables, the data read out by the scanner, by which any color of one of the tristimulus values was read out, is converted into the reference image signal so that the read out data will have the same color as that of the tristimulus values. As a result, the exposing mask, by which the same color of the tristimulus values as the read out color is obtained, can be produced. Here, in the case of the input data which is not included in the LUT, the output value of the data is calculated by the interpolation calculation equations.

As described above, when the LUTs (look-up tables), obtained as above, interpolation calculation equations, and matrix operation equations are stored in the personal computer installed in the image data edit section, the color of the original which is read by the scanner, the color of the image of the data which is read from the original and displayed on the CRT, and the color of the image which was printed onto the paper using the exposing mask, which is produced using the data read from the original, can be equal to the same colors. In this connection, as the result of color reproduction tests, the accuracy of the color reproduction of the colors of the original, which were inputted into the apparatus, to the colors of the copied original, which were formed on the paper, was $\Delta E \leq 5$.

In this example, the relationship between the input data and output data was experimentally found, and the data conversion tables (LUT) were produced and stored in the personal computer as the image data conversion method so that the inputted original can be reproduced when exposure conditions of the printer are constant. In this method, the input data and the finally outputted data are directly related to each other, without considering the intermediate portion between these two data. Accordingly, it is not necessary to consider the effect of abnormal absorption in the intermediate portion between the input portion and the output portion, the effect of the reversed transfer in the sublimation printer, or the like. However, there are a large number of colors, and therefore, a rather large memory is necessary when data of all colors are arranged on tables and stored in the personal computer. In order to solve this problem, there is a method in which input/output tables are produced at several intervals, and data between the intervals are obtained by interpolation calculations. For this interpolation calculation method and the production method for data conversion tables (LUTs), methods, disclosed in U.S. Pat. No. (5,065, 234), Japanese Patent Publication Open to Public Inspection Nos. 314636/1986, 89006/1987, 89008/1987, and 238507/1988, can be used.

Due to the above-described Examples 1 and 2 of the present invention, the color of the original can be reproduced under conditions in which exposure conditions of the printer are set at predetermined values. That is, when exposure conditions of the subsidiary exposure section are initially set to its reference exposure conditions, the exposing mask is produced on the assumption of the reference exposure conditions thereafter. Accordingly, it is not necessary that the exposure conditions are adjusted for each exposing mask.

For comparison of durations necessary for producing the print, the operation duration in the present invention, when exposure condition are set to the predetermined values and the color of the original is reproduced, was compared with the operation duration when the exposure condition is obtained for each print like that of conventional exposing masks. By the method of the present invention, 50 types of exposing masks (100 mm×150 mm) of a full-color image of the negative film were produced. Fifty types of the same images were produced using the conventional silver halide photographic photosensitive film by conventional methods. The exposing mask was set in the subsidiary exposure section of the printer 5N3 made by Konica Co. Then, images are printed onto Konica QA paper TYPE: A6, for 50 respective sheets of exposing masks. The following table shows the result of measurement of the time for processing the 50 types of exposing masks in each method. In the pre-exposure process, each exposing mask is printed, and the result of printing is visually inspected so that the exposure conditions are set to predetermined values. In the method of the present invention, the pre-exposure process and the exposure condition setting process are not necessary, so that the operation time was greatly reduced.

|  | Pre-exposure | Exposure condition setting | Primary exposure operation | Total operation time |
| --- | --- | --- | --- | --- |
| Examples 1, and 2 |  |  | 40 min. | 40 min. |
| Conventional method | 25 min. | 30 min. | 40 min. | 95 min. |

As seen in the examples of the present invention, when the exposure conditions of the printer are set to predetermined values, and image data is converted so that the read-in original is reproduced on the final copied paper, the operation time can be greatly reduced.

As described above, according to the image forming method of the present invention, data processing is carried out after the input image signal has been converted into digital image data. Accordingly, when the exposing mask is produced, data processing and correction of the digital image data can be easily carried out.

Further, according to the image forming method of the present invention, when the exposing mask is exposed and printed, the printing apparatus is adjustment-controlled so that a quantity of light is a predetermined value in order to adjust the color balance without setting the exposing mask. Accordingly, exposure time of the printer and filter conditions can be regulated, so that setting operations of various conditions can be conducted in a short period of time.

Further, according to the image forming method of the present invention, a test patch is also produced when the exposing mask is produced, and the test patch is measured so that printing conditions of the photosensitive material are adjusted as necessary. Accordingly, even when an aging change of the exposure characteristics of the printer occurs, the exposure characteristics can always be set to the optimum exposure conditions at the time of printing, so that a stable image can be reproduced on the photosensitive material.

When the image input means converts an analog signal, recorded on the transmission type or the reflection type original, into a digital signal, or it inputs an image, which is combined with images of digital signals inputted from the image output medium, into the apparatus, an analog image such as a photograph, or the like, or a digital image outputted from the outer image output medium, is inputted into the apparatus, and can be edited.

Further, when the digital image data obtained by the data processing is converted into analog image data, and the exposing mask is produced according to the analog image data, the apparatus can be applied to the input image data whether the form of the input image data for producing the exposing mask is digital or analog.

Further, the image can be exposure printed onto the photosensitive material through the exposing mask on which the negative image is formed, or a silver halide photographic film is combined with the exposing mask and can be exposure printed onto the photosensitive material.

Still further, the exposing mask can be produced by methods of heat sublimation type recording, thermo-development recording, or ink jet recording.

Further, when the thickness of the exposing mask is between 51 [μm] and 200 [μm], the handling property can be increased at the time of the mask production. When the thickness of the image receiving layer of the exposing mask is between 0.5 [μm] and 20 [μm], a superior image can be obtained at the time of printing.

Yet further, according to the photographic printing apparatus of the present invention, when the exposing mask is exposure printed, the apparatus is adjusted and controlled so that a quantity of light in the exposure section is the predetermined value in order to adjust the color balance without setting the exposure mask. Accordingly, the exposure time of the printer or filter conditions can be regulated in the exposure section, so that setting operations of various conditions can be carried out in a relatively short period of time.

What is claimed is:

1. A method of printing an image on photographic paper with an image system including an exposure device having a reference exposure condition, comprising the steps of:
   (1) reading an original image and outputting digital image signals;
   (2) processing the digital image signals and forming from the processed digital image signals an image on a mask sheet corresponding to the original image, the processing step comprising:
      (a) measuring density of the original image;
      (b) printing the image formed on the mask sheet onto photographic paper by exposing the mask sheet under the reference exposure condition;
      (c) measuring density of the printed image on the photographic paper; and
      (d) processing the digital image signals so as to obtain the processed digital image signals and make the density of the printed image identical to the density of the original image, wherein the digital image signals are processed so as to satisfy a condition where the mask sheet is exposed under the reference exposure condition; and
   (3) exposing the mask sheet under the reference exposure condition so that the photographic paper is exposed with exposure light passing through the mask sheet and the image on the mask sheet is formed on the photographic paper.

2. The method of claim 1, wherein a plurality of original images differing in density are prepared so that plural combinations of the digital image signals and the processed digital image signals are obtained and a conversion table for converting the digital image signals to the processed digital image signals is made from the plural combinations.

3. The method of claim 2, further comprising the step of interpolating based on the conversion table to convert the digital image signals to the processed digital image signals.

4. The method of claim 3, wherein the image is formed on the mask sheet based on the processed digital image signals converted with the conversion table and the image formed on the mask sheet is printed under the reference exposure condition.

5. The method of claim 1, wherein the measuring steps measures tristimulus values instead of the density.

6. The method of claim 1, wherein the image on the mask sheet is formed as an ink image on a transparent sheet by a thermal transfer.

7. The method of claim 6, wherein the thermal transfer is a sublimation type thermal transfer.

8. The method of claim 6, wherein the mask sheet has a thickness of 51 μm to 200 μm.

9. The method of claim 6, wherein the mask sheet comprises an image receiving layer between the transparent sheet and the ink image, the image receiving layer having a thickness of 0.5 μm to 20 μm.

10. The method of claim 1, wherein a reference exposure light is adjusted so as to balance reference light amount and reference color.

11. The method of claim 1, wherein a reference exposure light is adjusted according to the reference exposure condition while the mask sheet is not positioned between a light source and a light receiving element.

12. A method of printing an image on photographic paper with an image system including an exposure device having a reference exposure condition, comprising the steps of:
   (1) reading an original image and outputting digital image signals;
   (2) processing the digital image signals and forming from the processed digital image signals an image on a mask sheet corresponding to the original image, the digital image signals being processed so as to satisfy a condition where the mask sheet is exposed under the reference exposure condition, the image on the mask sheet having a thickness of 51 μm to 200 μm and being an ink image formed on a transparent sheet by thermal transfer; and
   (3) exposing the mask sheet under the reference exposure condition so that the photographic paper is exposed with exposure light passing through the mask sheet and the image on the mask sheet is formed on the photographic paper.

13. A method of printing an image on photographic paper with an image system including an exposure device having a reference exposure condition, comprising the steps of:
   (1) reading an original image and outputting digital image signals;
   (2) processing the digital image signals and forming from the processed digital image signals an image on a mask sheet corresponding to the original image, the digital image signals being processed so as to satisfy a condition where the mask sheet is exposed under the reference exposure condition, the image on the mask sheet being an ink image formed on a transparent sheet by thermal transfer, and the mask sheet including an image receiving layer between the transparent sheet and the ink image, the image receiving layer having a thickness of 0.5 μm to 20 μm; and
   (3) exposing the mask sheet under the reference exposure condition so that the photographic paper is exposed with exposure light passing through the mask sheet and the image on the mask sheet is formed on the photographic paper.

14. A method of forming a mask sheet image onto photographic paper, comprising the steps of:
   (a) measuring density of each of three color components for each of a plurality of reference images so as to obtain a plurality of reference density data;

(b) reading the plurality of reference images so as to obtain a plurality of reference digital image signals;

(c) forming a plurality of images on a mask sheet based on a plurality of density signals;

(d) exposing the plurality of images on the mask sheet with a reference exposure light so that a plurality of latent images corresponding to the plurality of images on the mask sheet are formed on photographic paper;

(e) developing the plurality of latent images so that a plurality of print images are formed on the photographic paper;

(f) measuring density of each of the three color components for each of the plurality of print images so as to obtain a plurality of print image density data;

(g) making, based on the plurality of reference density data and the plurality of print image density data, a conversion table for converting the plurality of reference digital image signals to the plurality of density signals;

(h) reading another image so as to obtain a digital image signal;

(i) converting with the conversion table the digital image signal into a density signal;

(j) forming on a mask sheet based on the density signal an image corresponding to the other image; and (k) exposing the image of the mask sheet with the reference exposure light so that a latent image corresponding to the image of the mask sheet is formed on photographic paper.

15. The method of claim 14, wherein the three color components are blue, green, and red.

16. The method of claim 14, further comprising the step of obtaining tristimulus values from the density data of each of the plurality reference images and the plurality of print images, wherein the conversion table is formed based on the tristimulus values.

* * * * *